UNITED STATES PATENT OFFICE.

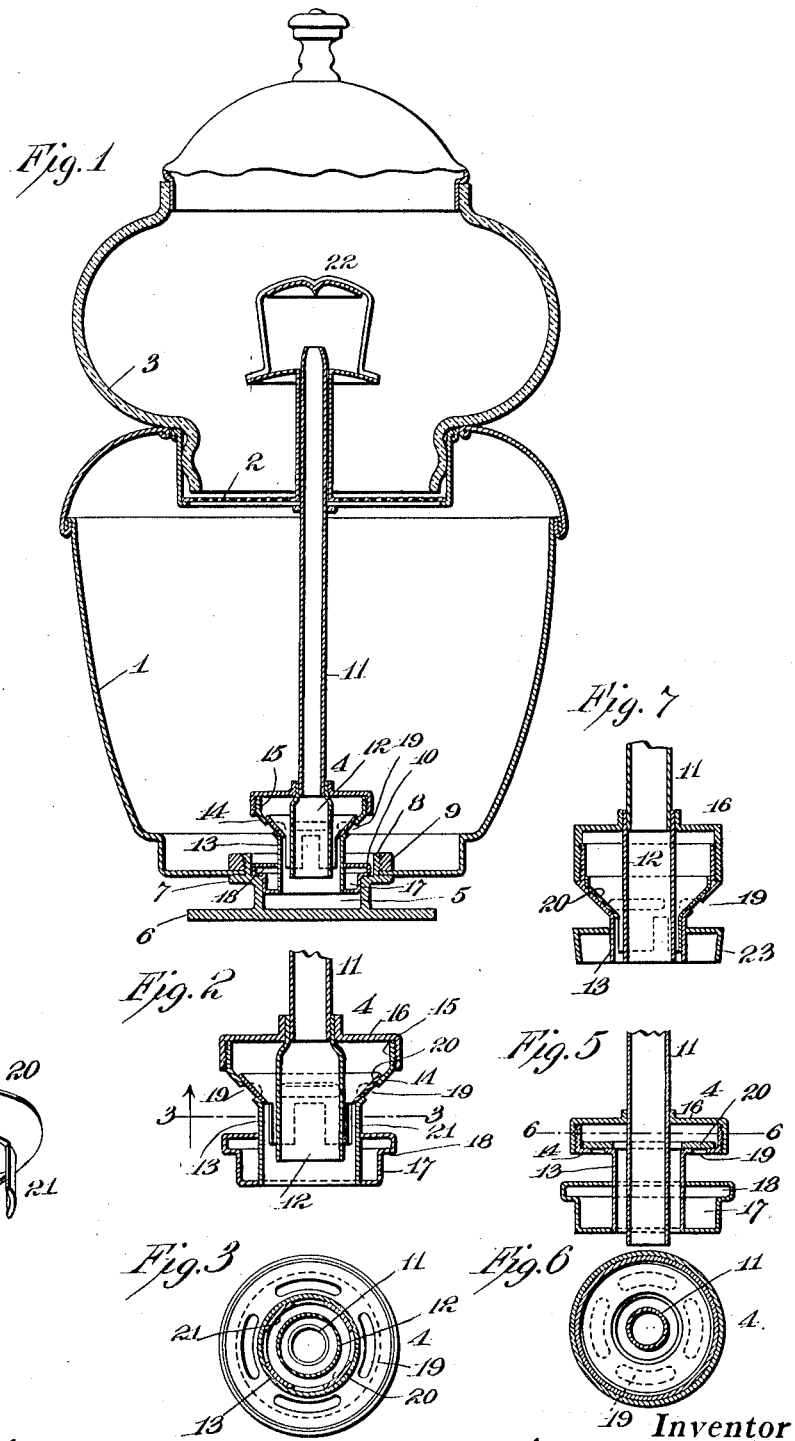

CHARLES NELSON, OF BROOKLYN, NEW YORK, ASSIGNOR TO S. STERNAU & COMPANY, A COPARTNERSHIP COMPOSED OF SIGMUND STERNAU AND LIONEL STRASSBURGER, OF NEW YORK, N. Y.

COFFEE-MACHINE.

1,054,234.    Specification of Letters Patent.    Patented Feb. 25, 1913.

Application filed August 24, 1907. Serial No. 389,997.

*To all whom it may concern:*

Be it known that I, CHARLES NELSON, a subject of the King of Sweden, residing in the borough of Brooklyn, county of Kings, and State of New York, have invented an Improvement in Coffee-Machines, (Case G,) of which the following is a specification.

The object I have in view is the production of a device for making an infusion of coffee, tea and other materials, and for analogous purposes, which may be embodied in what is termed a "coffee machine", a "coffee pot", a "tea pot", etc., which will make the infusion in the minimum space of time.

Further objects relate to the improvement in details of the device whereby it is made simple and cheap to manufacture and will not readily get out of order, and which may be readily cleaned.

Other objects of the invention will more fully appear in the following specification and accompanying drawings considered together or separately.

In the drawings Figure 1 is a sectional view of a coffee machine embodying my invention. Fig. 2 is a vertical section on an enlarged scale of the lower portion of the fountain. Fig. 3 is a section on the line 3—3 of Fig. 2 looking in the direction of the arrow. Fig. 4 is a perspective view of one form of valve. Fig. 5 is a vertical section of the lower portion of a modified form of fountain; and Fig. 6 is a section on the line 6—6 of Fig. 5. Fig. 7 is a vertical section of the lower portion of a modified form of fountain.

In all of the views like parts are designated by the same reference characters.

In the drawings, 1 represents the body of the coffee machine, which may also be the body of the coffee pot, tea pot or other vessel. The coffee or other substance of which the infusion is to be made is carried within the perforated screen or sieve 2, which depends from the lower open end of the glass globe 3. The arrangement of the details of construction of the body, screen and globe is immaterial and may be varied within wide limits, the object being to provide a support for the material of which the infusion is to be made, and retaining it in a position above the liquid in the body of the vessel and holding it in position to be acted upon by the liquid ejected by the fountain, which will permit the liquid to percolate through the material and descend into the body of the vessel.

The fountain 4 is for the purpose of forcing a continuous or intermittent stream of hot liquid from the bottom of the body 1 to above the screen 2, allowing such liquid to pass through the screen and its contents. For the purpose of reducing the quantity of liquid which must be heated in order to cause the fountain to act, I provide at the lower portion of the body 1 a small chamber 5. This chamber communicates at its open upper end with the body 1. It is shown as comprising a cylindrical body portion, the bottom of which extends outward to form a flange 6. This flange is for the purpose, when the device is used as a coffee machine, of conducting the heat to the chamber 5, and also as an insulator to keep the heat away from the bottom of the body 1. When used in connection with a coffee or tea pot, it serves the additional purpose of a foot or stand for the device. The upper portion of the chamber is formed with a smaller flange 7. Inside of the edge of this flange is a sleeve 8, the outer surface of which is screw-threaded for engagement with a nut 9. The opening in the bottom of the body 1 is slightly larger than the diameter of the sleeve 8 but smaller than the diameter of the flange 7. The nut 9 pinches the bottom of the body 1 against the flange 7 and makes a liquid tight joint. By removing the nut 9, the chamber 5 may be removed from the body 1. The space between the inside of the sleeve 8 and the inside of the body of the small chamber constitutes a seat or shoulder 10, upon which the fountain 4 rests.

The fountain includes a tube 11, which constitutes an outlet passage, which is preferably vertical and open at both ends. The upper end may be slightly contracted, as shown in Fig. 1, so as to secure a nozzle effect. The lower end may be expanded at 12. This expansion may be secured by enlarging the bottom of the tube 11, or by attaching to it a short length of larger tube, the upper end of which is reduced in size to engage with the tube 11, as is shown in Fig. 2. It is not necessary to enlarge the bottom of the tube 11, as it may be made of uniform diameter throughout, as is shown in Fig. 5. The tube 11 is supported upon a casing 13, which rests upon the shoulder 10. The casing is best made of a piece of tube, of slightly larger diameter than the largest portion of the tube 11. The lower portion of the outlet passage lies concentrically within the casing, which is of tubular form, and constitutes an inlet passage.

The upper portion of the casing flares outward at 14, at about an angle of 45 degrees, as shown in Fig. 2, although the flare may be horizontal, or substantially horizontal, as shown in Fig. 5. Beyond the flaring portion the casing extends upward to 15 with non-flaring walls, and is provided with screw-threads. This screw-threaded portion engages with a cover 16, which is permanently secured to the tube 11 and acts as a support for such tube. By means of the engagement of the cover with the casing, the inlet and outlet passages are temporarily or removably secured together. The lower portion of the casing 13 is connected to an air chamber 17, which has a flange 18, which rests upon the shoulder 10. The portion of the air chamber below the flange is such a size as to make a snug fit with the inside of the small chamber 5. The joint between the walls of the small chamber 5 and the air chamber is sufficiently tight to prevent circulation of liquid at that point. The purpose of the air chamber is to insulate the chamber 5 from the body 1.

The entrance of liquid from the body 1 into the fountain is by way of ports 19, which are located upon the flaring portion 14 of the casing 13. As many of these ports are used as is necessary, four being shown in Figs. 3 and 6. These ports are adapted to be closed by a valve 20, the said valve acting to permit the ready entrance of liquid from the receptacle 1 into the casing 13 and thence into the chamber 5, but closing the passage in the opposite direction.

One form of valve is shown in Fig. 4, the valve body having an inclined body adapted to rest upon the flaring portion of the casing 13. A slotted hollow stem 21 extends downward in engagement with the inner walls of the body of the casing so that the valve will be guided by engagement with such casing. The slots are for the purpose of permitting passage of liquid from the ports into the chamber 5.

In the modification shown in Fig. 5 the valve is in the form of a flat disk or washer, with a central opening which loosely surrounds the tube 12. The washer is guided in place when moved by engagement of its periphery with the upturned portion of the casing.

The operation of the device is as follows: When used in connection with a coffee machine, the coffee or other material of which an infusion is to be made is introduced within the screen 2. Cold water is introduced within the body 1, and assumes a certain definite height therein. The water will enter the outlet passage by passing through the ports 19 and descending in the casing or inlet passage into the chamber 5, will rise in the tube 11, and occupy the same height as the water in the body 1, or slightly higher, as depends upon capillary action. The contents of the chamber 5 being heated by a spirit lamp or other device, the water within the tube 11 will be expanded, and owing to such expansion and the generation of steam within the chamber, the water within the tube 11 will be driven upward, striking against the deflector 22, or equivalent device, and will be sprayed upon the contents of the screen 2, percolating through such material and finding its way back into the body 1. As the level of liquid in the tube 11 descends, owing to discharge through the upper end of the tube, the valve 20 will be lifted from its seat, permitting the entrance of liquid from the body 1 into the chamber 5 through the inlet passage. This liquid will be heated and ejected through the tube 11, the valve preventing circulation in the opposite direction. This operation will continue until an infusion of the desired strength is made.

The action of the apparatus will be very quick, the liquid being ejected through the fountain a few seconds after the lamp is introduced in place. One advantage that this device has is that all of the liquid which is ejected through the fountain must pass through the chamber 5, consequently is heated, therefore all the liquid which comes in contact with the coffee is of high temperature, which greatly improves the flavor of the infusion and increases the speed necessary to produce an infusion of the desired strength. The air chamber 17 insulates the contents of the body 1 from the contents of the chamber 5 and prevents the liquid in the lower part of the body from being elevated in temperature. It also serves the purpose of retaining all of the heat within the chamber 5, consequently the efficiency of the device is improved.

By my invention I produce a device which is very readily cleaned, as the fountain may be lifted out of the chamber 5, and the latter chamber is sufficiently large to be cleaned without the need of special tools. By unscrewing the cover 16 from the casing 13, the valve 20 may be reached and cleaned as may also the inside of the casing and the outside of the expanded portion of the tube 11.

It will be seen that the valve rests upon its seat until it is elevated by the pressure of the liquid being greater in the body 1 than in the chamber 13. I avoid the use of springs for closing the valve and avoid the use of a valve which is carried upon hinges.

The valve being outside and above the lower extremity in the inlet passage, all danger of choking the valve by the accidental introduction of coffee or tea in the upper end of the tube 11 will be prevented. If any coffee or tea is accidentally introduced in the tube 11 and descends down into the chamber 5, it will be ejected from such chamber up the tube 11 and never come in contact with the valve 12. This I regard as a very important advantage over devices in which a valve is in direct communication with the ejecting tube of the fountain.

The use of the casing 13 and the tube 11 lying concentrically within it produces a circulating system which comprises two passages for admitting liquid into the chamber 5 and removing it therefrom. One of these tubes lies within the other, consequently the device is rendered very compact.

Fig. 7 illustrates a modification in which the air chamber is omitted. The fountain in this form does not rest upon the shoulder 10, but the side walls 23 taper as shown, and engage with the inner surface of the side of the small chamber 5, which should be tapered to correspond. By this means the lower extremities of the inlet and outlet tubes will be above the bottom of the chamber. Both passages end upon the same longitudinal plane. As indicated in Figs. 2, 5 and 7, the lower extremities in the inlet and outlet passages need not be upon the same horizontal plane, although in the embodiment illustrated in Fig. 7, this is the case. In Fig. 2, the outlet passage begins at a point above the lower extremity of the inlet passage, while in Fig. 5, the inlet passage ends at a point above the plane of the beginning of the outlet passage. The operation of these three structures is practically the same, the liquid, in passing downward through the inlet passage, entering the chamber 5, and from there is ejected through the outlet passage. In order to secure this desirable result, it is not necessary to have the beginning of the outlet passage extend into the chamber 5, as with the construction shown in Fig. 1, the lower extremity of the outlet passage can terminate above the upper end of such chamber. In such construction the liquid will be deflected into the chamber in passing downward through the inlet passage irrespective of the fact that the tube 12 does not extend down into such chamber.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. A fountain for a coffee machine, having an outlet tube, a valve casing surrounding and inclosing one end of said tube, said tube extending into the casing, a port in the wall of the casing, and a valve surrounding the outlet tube, and resting by gravity upon the wall of the casing, and closing the port, the wall of the casing where the valve engages the same being arranged at an angle to the vertical.

2. A fountain for a coffee machine which comprises a tube forming an outlet passage, a casing surrounding the tube and having a reduced portion which forms an inlet passage, the cover of the casing being permanently secured to the tube which forms the outlet passage and removably secured to the casing.

This specification signed and witnessed this 21st day of August, 1907.

CHARLES NELSON.

Witnesses:
LEONARD H. DYER,
J. F. COLEMAN.